United States Patent [19]

Harris et al.

[11] Patent Number: 4,660,105

[45] Date of Patent: Apr. 21, 1987

[54] CASSETTE RECORDING OR NON-RECORDING INDICATING MECHANISM

[75] Inventors: Clark E. Harris, Fairport; Roger G. Covington, Rochester; David E. Foeller, Batavia, all of N.Y.

[73] Assignee: Eastman Kodak Company, Rochester, N.Y.

[21] Appl. No.: 799,513

[22] Filed: Nov. 19, 1985

[51] Int. Cl.$^4$ .................. G11B 15/04; G11B 23/03
[52] U.S. Cl. ............................ 360/60; 360/133
[58] Field of Search .................. 360/60, 132, 133

[56] References Cited

U.S. PATENT DOCUMENTS

| | | | |
|---|---|---|---|
| 3,692,956 | 9/1972 | Northrup | 179/100.2 Z |
| 4,003,088 | 1/1977 | Schwartz | 360/60 |
| 4,399,480 | 8/1983 | Edwards | 360/133 |
| 4,409,630 | 10/1983 | Saito | 360/99 |
| 4,536,812 | 8/1985 | Oishi et al. | 360/133 |

Primary Examiner—Vincent P. Canney
Attorney, Agent, or Firm—Steve W. Gremban

[57] ABSTRACT

A cassette indicating mechanism is disclosed for a cassette of the type having top and bottom halves and an information recording medium interposed therebetween. The indicating mechanism indicates whether information can or cannot be recorded on the recording medium. The cassette indicating mechanism is in a normal recording position in which a colored portion thereof is visible and preferably blocks an interfacing detector of a recording device. The blocked detector actuates the recording device to permit recording on the recording medium. The indicating mechanism is movable to a non-recording position in which the colored portion is hidden and the interfacing detector of the recording device is preferably unblocked. The unblocked detector actuates the recording device to prevent recording on the recording medium.

6 Claims, 5 Drawing Figures

CASSETTE RECORDING OR NON-RECORDING INDICATING MECHANISM

BACKGROUND OF THE INVENTION

1. Field of the Invention

This invention relates generally to cassettes containing an information recording medium, and more specifically to a cassette mechanism for indicating whether the cassette is in a recording or non-recording condition.

2. Description of the Prior Art

U.S. Pat. No. 4,409,630 which issued to Saito on Oct. 11, 1983 discloses a slidable member supported between upper and lower plates for preventing inadvertent erasure of the information signals from an information recording medium. The slidable member has a body portion provided with an extending finger formed by a slot. The finger has a projection at its free end adapted to selectively seat in one of a pair of spaced grooves upon movement of the slidable member between recording or non-recording positions. In the recording position of the slidable member, the interfacing recording device will record information on a previously unrecorded medium. In the non-recording position, the interfacing recording device is prevented from recording so that a previous recording on the medium will not be inadvertently erased.

An apparatus for preventing erasure of previously recorded material by placing the casette in a non-recording mode of operation is disclosed in U.S. Pat. No. 4,460,930 which issued to Takahashi on July 17, 1984. The apparatus comprises a piece formed simultaneously with the disk cassette cover by a molding process. The piece has a configuration which enables it to be slidably remounted to the disk cover after being torn off the cover.

U.S. Pat. No. 4,517,617 which issued to Tsuji et al. on May 14, 1985 discloses a cassette having a channel-shaped cut-out portion at a corner thereof. An erasure preventing piece at the corner is connected integrally with the cassette through a thin portion formed by a V-shaped groove. The piece can be separated from the cassette by pivoting it outwardly and breaking it off so that when the cassette is placed in an interfacing recording device, it will not operate to inadvertently erase a previously recorded medium.

SUMMARY OF THE INVENTION

In a preferred embodiment of the present invention, a cassette indicating mechanism is disclosed for selectively placing a cassette of the type having top and bottom halves and an information recording medium interposed therebetween in a recording or non-recording condition. In the recording condition, an interfacing recording device will be made operative to record information on the recording medium. In the non-recording condition, the recording device is actuated to prevent recording so that information previously recorded on the recording medium will not be inadvertently erased.

The cassette indicating mechanism comprises a pair of spaced apart walls on one of the top and bottom halves facing the other half, an abutment means on one of the top and bottom halves between the walls at one end thereof, and a post on one of the top and bottom halves between the walls at the opposite end thereof. The post has a side surface defining front and rear cam surfaces merging at an apex. An aperture is provided in the other of the top and bottom halves in register with at least a part of the space between the walls adjacent the abutment means.

A slidable insert is interposed between the walls and the top and bottom halves for slidable movement to and from the abutment means. The insert has a body portion with a front surface and a rear surface facing the abutment means. The insert further has at least one flexible finger extending from the front surface thereof with its free end having a V-shaped projection adapted to flex over the apex of the side surface of the post and resiliently selectively engage the front and rear cam surfaces thereof. The insert is selectively slidably movable between recording and non-recording positions. In the recording position, the insert is captured between the abutment means and the rear cam surface of the post for releasably holding the body portion thereof in register with and blocking or closing the aperture. When the cassette is mounted in a recording device, means therein interfacing with the cassette mechanism is actuated by the closed aperture to permit the recording of information on the medium. In the non-recording position, the post is captured between the front surface of the body portion and the projection on the finger for releasably holding the body portion out of register with and unblocking the aperture. In this non-recording position, the recording device interfacing means prevents operation of the recording device when the cassette is mounted therein so that previously recorded information on the medium will not be inadvertently erased.

In a more specific aspect of the invention, the post has a substantially elliptical cross section and is positioned such that an extension of its major axis is equidistant from the walls. The insert further has a pair of spaced fingers extending from the front surface of the body portion with the projections on the fingers facing one another and spaced apart a smaller distance than the thickness of the post along its minor axis.

A primary advantage of this invention is to provide an improved cassette recording or non-recording indicating mechanism of simple design and construction for indicating whether information can or cannot be recorded on the information recording medium in the cassette. The cassette recording or non-recording indicating mechanism involves few parts, is thoroughly reliable and efficient in operation and economical to manufacture.

The invention and its advantages will become more apparent from the detailed description of the invention presented below.

BRIEF DESCRIPTION OF THE DRAWINGS

In the detailed description of the invention presented below, reference is made to the accompanying drawings, in which.

DETAILED DESCRIPTION OF THE INVENTION

Figure 1:
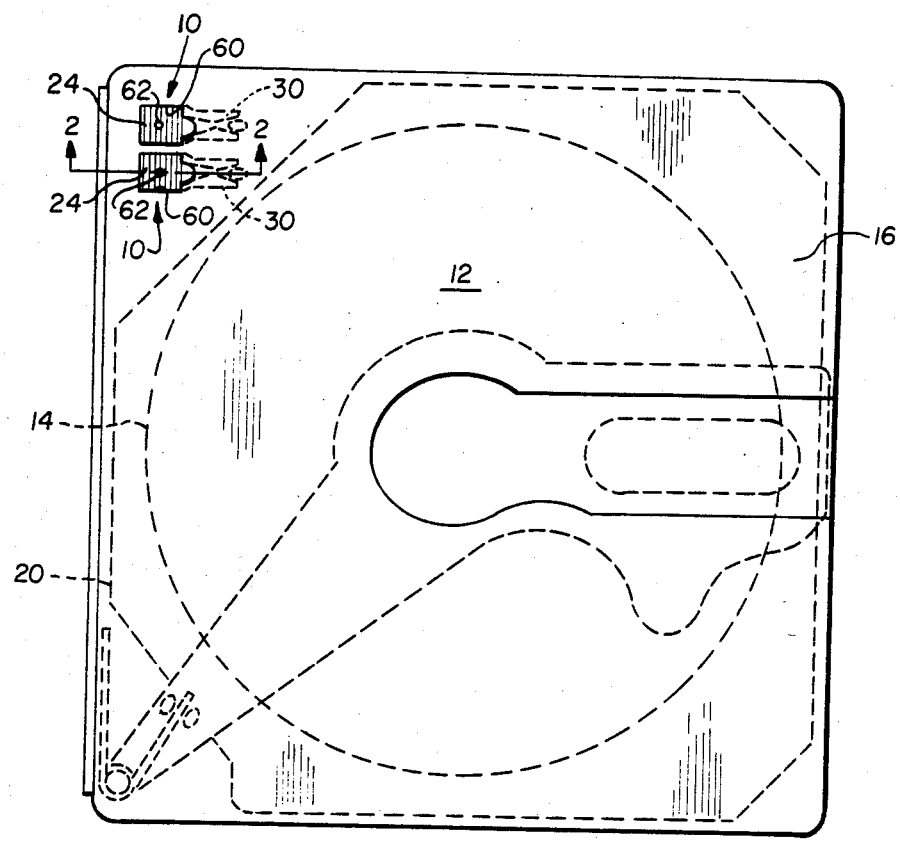
FIG. 1 is a top plan view of a disk cassette in which a preferred embodiment of the cassette recording or non-recording indicating mechanism of this invention is embodied.
Figure 2:
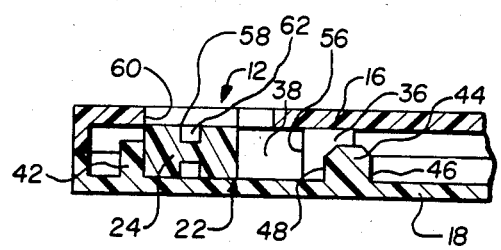
FIG. 2 is an enlarged section view taken substantially along line 2—2 of FIG. 1.

Referring to FIG. 1 of the drawings, a preferred embodiment of a pair of cassette recording or non-recording indicating mechanisms 10 of this invention are shown incorporated in a disk cassette 12 or the like. Each cassette indicating mechanism 10 is designed to indicate to the user that information can or cannot be recorded on both sides of a discrete region of an information recording medium or disk 14 contained therein. During manufacture, the indicating mechanism 10 is located in a normal recording position on cassette 12 indicating that information can be recorded on the medium. After recording, the user manually moves indicating mechanism 10 to a non-recording position which interfaces with a recording mechanism in a known way as shown and described in U.S. Pat. No. 4,460,930 to prevent recording which would erase the previously recorded information.

The illustrated disk cassette 12 normally comprises top and bottom halves 16, 18 respectively preferably formed of a relatively rigid molded material to enclose and protect information storage medium or disk 14 which is housed in a jacket 20. Once loaded and closed, the enclosure halves 16, 18 can be sealed together to prevent removal of disk 14. Because disk cassettes 12 and other record disk assemblies are well known, the present description will be directed in particular to the cassette recording or non-recording indicating mechanisms 10 incorporated therein and to only those portions of the cassette directly associated therewith. Since the cassette indicating mechanisms 10 are identical, each indicating the recording or non-recording condition of a discrete region of disk 14, only one of the mechanisms will be described in detail.

With reference to FIGS. 2-5, the cassette indicating mechanism 10 comprises an insert 22 having a flat substantially square body portion 24 slidably mounted between walls 26 on bottom half 18 of the cassette. The body portion 24 has a rear surface 28 and a pair of spaced apart flexible fingers 30 extending outwardly from a front surface 32 thereof. The fingers 30 have inwardly facing V-shaped projections 34 having front and rear ramp surfaces 36, 38 respectively which in combination with front surface define a diamond-shaped enclosure 40.

Figure 3:
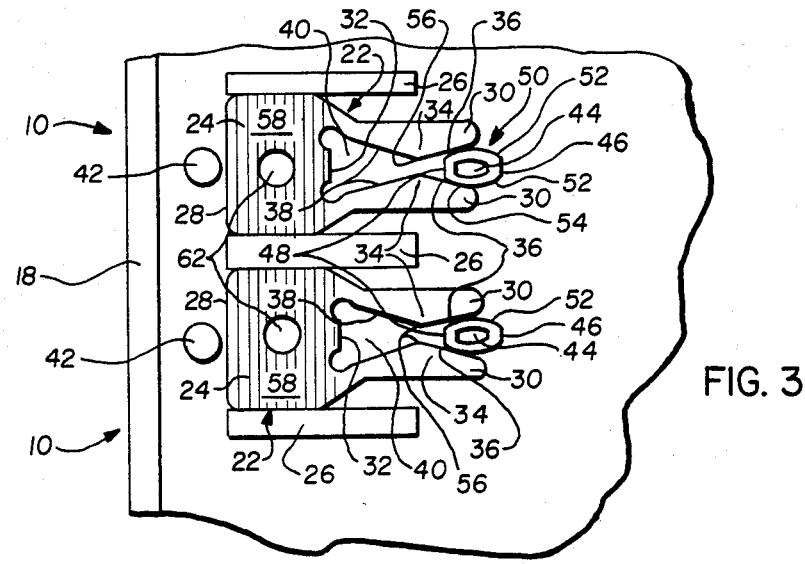
FIG. 3 is an enlarged segmental top plan view of the cassette recording or non-recording indicating mechanism with the top half removed and both indicating mechanisms shown in normal recording positions indicating that information can be recorded on two discrete regions of the information recording medium.

The insert 22 in its normal recording position, as best seen in FIG. 3, is interposed and held captive between an abutment means, such as a cylindrical lug 42 extending from the inner surface of bottom cassette half 18, and a post 44 likewise extending from bottom cassette half 18. The post 44 has front and rear ends 46, 48 respectively thereof joined by a pair of side surfaces 50, each having front and rear cam surfaces 52, 54 respectively merging together at the apex 56 of side surface 50. The upper face 58 of body portion 24 is preferably colored red so that it is clearly visible to a cassette user through an aperture 60 extending through top cassette half 16 in register with body portion 24. As indicated earlier, in this normal recording position of insert 22, the red face 58 of body portion 24 is visible through aperture 60 and blocks the aperture to indicate that information can be recorded on the medium 14. When cassette 12 is inserted in a recording device, not shown, detecting means therein, not shown, respond to the blocked aperture 60 to permit recording.

Figure 4:
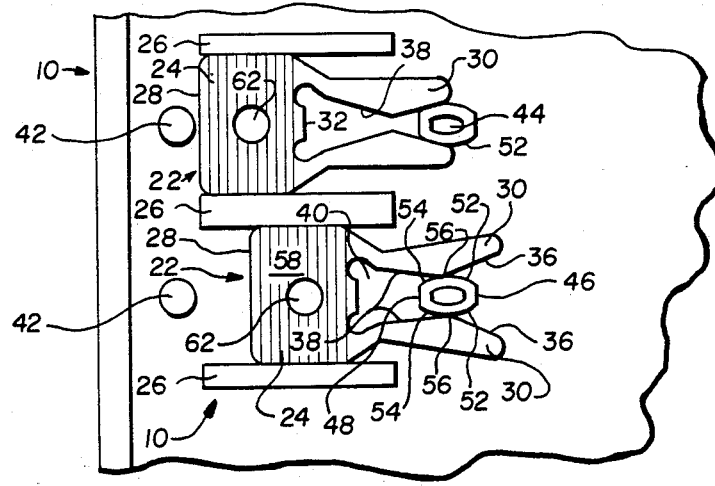
FIG. 4 is a segmental view similar to FIG. 2 showing one of the recording or non-recording indicating mechanisms midway between its normal recording position and a non-recording position.
Figure 5:
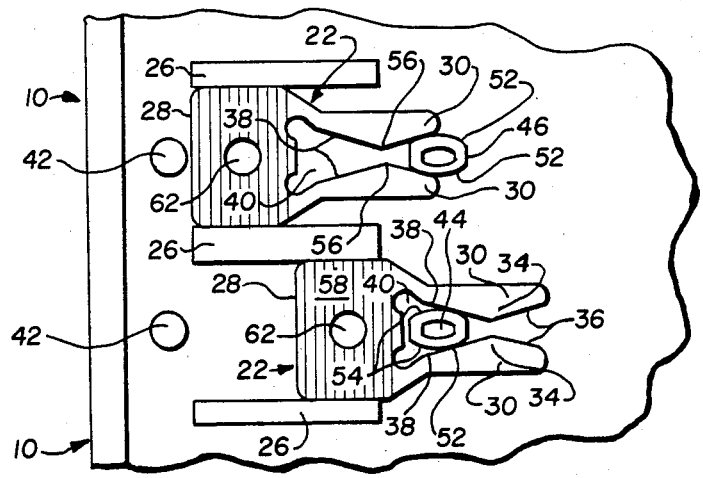
FIG. 5 is a segmental view similar to FIGS. 3 and 4 showing one of the indicating mechanisms in its non-recording position.

After information has been recorded on recording medium 14, a pointed member such as the tip of a ball point pen can be inserted through aperture 60 into a recess 62 on body portion 24 for moving insert 22 to the right causing front ramp surfaces 36 to rind on rear cam surfaces 54 which flex fingers 30 apart, as best seen in FIG. 4. When projections 34 pass over the apexes 56 of the side surfaces 50 and onto front cam surfaces 52, fingers 30 snap together capturing post 44 in enclosure 40 for releasably holding insert 22 in a non-recording position. In this position, body portion 24 and red face thereof is hidden beneath the top half 16 of the cassette. If cassette 12 were then placed into a recording device, the detecting means therein, not shown, would respond to the open aperture 60 and inactivate the recording device so that information could not be recorded over and inadvertently erase the previously recorded information. However, if it were later desired to erase the recording, insert 22 could be manually returned to its recording position.

The cassette 12 shown in FIG. 1 is provided with two identical cassette recording or non-recording indicating mechanisms 10. One of the mechanisms is associated with both sides of one discrete region of the recording medium whereas the other mechanism is associated with both sides of a different discrete region of the recording medium.

The positioning of insert 22 and its interface with the detecting means of a recording device has been selected so that in the normal recording position of the indicating mechanism (red face visible) recording is possible, and in the non-recording position (red face hidden) it is impossible to record. However, it should be understood that the reverse is possible, that is, the detecting means and insert position interface could be designed so that in the previous normal recording position (red face visible) recording is not possible to erase previously recorded information, and in the previous non-recording position (red face hidden) recording is possible. With this type of design, cassette 12 would be manufactured with cassette indicating mechanism 10 in the position in which the red face of insert 22 is hidden, and this would be the normal recording position. Following recording, cassette indicating mechanism 10 would be moved to a non-recording position (red face visible).

The invention has been described in detail with particular reference to preferred embodiments thereof, but it will be understood that variations and modifications can be effected within the spirit and scope of the invention.

What is claimed is:

1. A cassette indicating mechanism for selectively placing a cassette of the type having top and bottom halves and an information recording medium mounted therebetween in a recording or non-recording condition, the combination comprising:

a pair of spaced apart walls on said bottom half facing said top half, an abutment means on said bottom half between said walls at one end thereof, and a post on said bottom half between said walls at the opposite end thereof, said post having a side surface defining front and rear cam surfaces merging at an apex;

an aperture in said top half in register with at least a part of the space between said walls adjacent said abutment means; and a slidable insert interposed between said walls and said top and bottom halves for slidable movement to and from said abutment means, said insert having a body portion with a front surface and a rear surface adjacent said abutment means, said insert further having at least one flexible finger extending from said front surface thereof having a projection on a side thereof facing said post and adapted to flex over said apex of said side surface and to resiliently selectively engage said front and rear cam surfaces thereof, said insert being selectively slidably movable between a normal recording position in which said insert is captured between said abutment means and said rear cam surface of said post with said body portion thereof in register with and blocking said aperture, and a non-recording position in which said post is captured between said front surface of said body portion and said projection for releasably holding said body portion out of register with and unblocking said aperture.

2. A cassette mechanism according to claim 1 wherein said projection is a substantial V-shaped projection, and said abutment means comprises a cylindrical lug.

3. A cassette mechanism according to claim 2 wherein said side surface of said post is a substantially convex surface.

4. A cassette indicating mechanism according to claim 3 wherein said aperture is substantially square.

5. A cassette indicating mechanism according to claim 4 wherein the face of said body portion visible through said aperture is colored, said color being clearly visible when said body portion is in register with said aperture, and is hidden from view when said body portion is out of register with said aperture.

6. A cassette indicating mechanism according to claim 5 wherein said post has a substantially elliptical cross section and is positioned such that an extension of its major axis is equidistant from said walls, and said insert has a pair of spaced fingers extending from said front surface with said V-shaped projections facing one another and spaced apart a smaller distance at their apexes than the thickness of said post along its minor axis.

* * * * *